(12) United States Patent
Schick et al.

(10) Patent No.: US 6,227,244 B1
(45) Date of Patent: May 8, 2001

(54) FEEDBACK SYSTEM FOR A SERVO VALVE SYSTEM

(75) Inventors: Bernd Schick, Winterbach; Bernd Langkamp, Lichtenwald; Edwin Breuning, Denkendorf; Karl-Hans Koehler, Wernau, all of (DE)

(73) Assignee: Mercedes-Benz Lenkungen GmbH, Duesseldorf (DE)

( * ) Notice: Subject to any disclaimer, the term of this patent is extended or adjusted under 35 U.S.C. 154(b) by 0 days.

(21) Appl. No.: 09/319,316

(22) PCT Filed: Nov. 26, 1997

(86) PCT No.: PCT/EP97/06581

§ 371 Date: Jun. 4, 1999

§ 102(e) Date: Jun. 4, 1999

(87) PCT Pub. No.: WO98/24678

PCT Pub. Date: Jun. 11, 1998

(30) Foreign Application Priority Data

Dec. 5, 1996 (DE) .............................. 196 50 474

(51) Int. Cl.$^7$ ..................................... F15B 9/10
(52) U.S. Cl. .................... 137/625.23; 91/375 A
(58) Field of Search ............... 91/375 R, 375 A; 137/625.23; 180/423

(56) References Cited

U.S. PATENT DOCUMENTS

| 3,998,131 | * | 12/1976 | Adams | 91/375 A X |
|---|---|---|---|---|
| 4,343,330 | * | 8/1982 | Numasawa et al. | 91/375 A X |
| 6,009,903 | * | 1/2000 | Rohringer et al. | 137/625.23 |
| 6,070,515 | * | 6/2000 | Urbach | 91/375 A |

FOREIGN PATENT DOCUMENTS

| 42 34 571 | | 4/1994 | (DE) . | |
|---|---|---|---|---|
| 4242441 | * | 5/1994 | (DE) | 137/625.23 |
| 43 29 999 | | 1/1995 | (DE) . | |
| 196 16 439 | | 12/1997 | (DE) . | |
| 0468659 | * | 1/1992 | (EP) | 137/625.23 |
| 2044697 | * | 11/1980 | (GB) | 137/625.23 |
| 2 199 000 | | 6/1988 | (GB) . | |
| 2250002 | * | 5/1992 | (GB) | 137/625.23 |

* cited by examiner

*Primary Examiner*—John Rivell
*Assistant Examiner*—Meredith H Schoenfeld
(74) *Attorney, Agent, or Firm*—Evenson, McKeown, Edwards & Lenahan, P.L.L.C.

(57) ABSTRACT

A reaction arrangement on a hydraulic servo-valve arrangement which is designed in the manner of a rotary-slide arrangement, with a rotary slide and with a control bush coaxially surrounding the rotary slide and rotatable relative to the latter, in particular for power steering systems of motor vehicles. Arranged on a shaft part located on the rotary-slide side are axial V-grooves, into which reaction bodies can be pressed with controllable hydraulic pressure. The reaction bodies are guided radially on a bush portion connected fixedly in terms of rotation to the control bush.

30 Claims, 4 Drawing Sheets

FEEDBACK SYSTEM FOR A SERVO VALVE SYSTEM

BACKGROUND AND SUMMARY OF THE INVENTION

Figure 1:
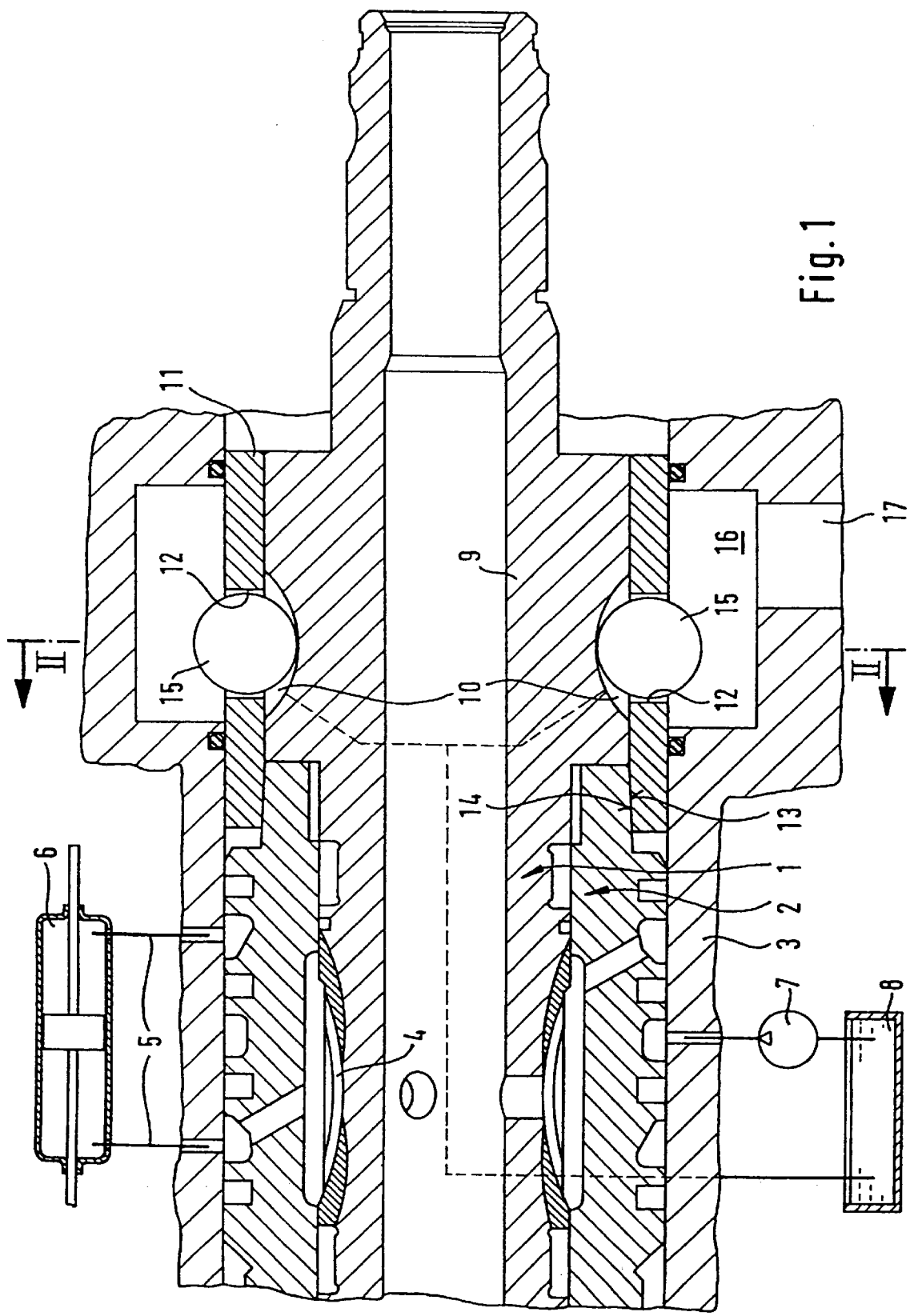

The invention relates to a reaction arrangement on a hydraulic servo-valve arrangement which is designed in a manner of a rotary-slide arrangement and has a rotary slide and a control bush coaxially surrounding the latter and rotatable relative to the rotary slide and which is provided, in particular, for power steering systems of motor vehicles.

Hydraulic power steering systems are installed as standard in most motor vehicles. It is basically known, here, for the manual force detectable on the steering wheel or to be applied during steering maneuvers to be modified as a function of parameters, in order, for example, to make the steering somewhat heavier at high speed and especially light at low speed, in particular within a speed range typical of a parking manoeuvre. For this purpose, so-called reaction arrangements are used, by means of which the force necessary for adjusting the servo-valve arrangement can be modified. As regards a servo-valve arrangement designed in the manner of a rotary-slide arrangement, this is tantamount to the fact that the force necessary for rotating the rotary slide and control bush relative to one another can be modified in a controllable way.

In this respect, it has already been proposed, according to DE 196 16 439 A1 (not previously published), to arrange axial grooves, with flanks spreading radially outwards in a V-shaped manner, on a shaft part located on the rotary-slide side and connected fixedly in terms of rotation to the rotary slide and to arrange radial guides for reaction bodies, capable of being pressed into the axial grooves, on a bush portion which coaxially surrounds the abovementioned shaft part and is connected fixedly in terms of rotation to the control bush, the reaction bodies then being capable of being subjected to hydraulic pressure controllable as a function of parameters, so that the said reaction bodies seek to penetrate with controllable force into the axial grooves and consequently oppose to relative rotation between the shaft part and bush portion a controllable resistance which also depends on the shape of the reaction bodies, for example balls, and on the steepness of the flanks of the axial grooves.

In a power steering system known from DE 42 34 571 A1, a centring device, which has a torsion bar clamped between an input shaft and an output shaft, is provided for the servovalve. Since the torsion bar does not allow exact mid-centring between the rotary slide and a valve bush, a spring element is provided, which is connected by means of weld spots to a ring fixed in the rotary slide, is provided, the said spring element being designed as a corrugated spring. The spring element carries a centring piece which is provided with pairs of oblique faces and which is pressed under prestress against rolling bodies. The rolling bodies are supported in corresponding pairs of oblique faces of a further centring piece which is connected to the drive shaft via a connecting part for the torsion bar. When the input shaft and output shaft are rotated relative to one another, the cooperation of the rolling bodies with the abovementioned oblique faces of the centring pieces causes an axial force to be generated which is converted into a resetting force and ensures that the valve is set exactly into its middle position.

DE 43 29 999 C1 relates to a servovalve having an axially displaceable control sleeve. Here, the valve consists of an input shaft, an output shaft, a torsion bar, which is connected at one end to the input shaft and at the other end to the output shaft, a valve sleeve surrounding the input shaft and a control sleeve arranged between the valve sleeve and the input shaft and axially displaceable as a function of a rotation of the input shaft, control grooves arranged in the valve sleeve and on the axially displaceable control sleeve cooperating hydraulically. These control grooves are arranged in such a way that the hydraulic flow is interrupted when the servovalve is in the middle position. By means of an actuating element arranged on the servovalve, a force counteracting the axial displacement is exerted on the control sleeve when the force resulting from the pressure acting on the actuator reaches a predetermined ratio to the force acting on the input shaft.

The object of the invention, then, is to indicate an advantageous design for a reaction arrangement of the type specified in the introduction.

This object is achieved in that, in addition to the above-described shaft part and the associated bush part, there is provided a housing surrounding the bush part and having at least one radial orifice, through which the reaction bodies can be inserted into the radial bores of the bush part when the latter is appropriately positioned, the housing and the bush part being capable of being axially adjustable relative to one another between a mounting position, in which the housing-side radial orifice and the radial bores of the bush part lie in a common radial plane with respect to the bush axis, and an operating position, in which the radial orifice is axially offset relative to the radial bores and the reaction bodies cannot in any way be pushed in a bolt-like manner into the radial orifice.

The invention is based on the general idea of arranging the reaction bodies in the housing only after the shaft part located on the rotary-slide side and the bush part located on the control-bush side have been mounted, the said housing then being capable of surrounding the reaction bodies in a cage-like manner.

This at the same time affords the advantage that the shaft part with the axial grooves may have a larger diameter, in particular a diameter which is large in comparison with the rotary slide, and the torque capable of being generated is correspondingly high.

The radial orifice may, if appropriate, perform a double function, by serving, on the one hand, for inserting the reaction bodies and, on the other hand, as a hydraulic connecting orifice, via which the reaction bodies are subjected, for reaction control, to the hydraulic pressure controllable as a function of parameters.

Moreover, as regards preferred features of the invention, reference is made to the claims and to the following explanation of the drawing, by means of which particularly preferred embodiments of the invention are described.

Figure 2:
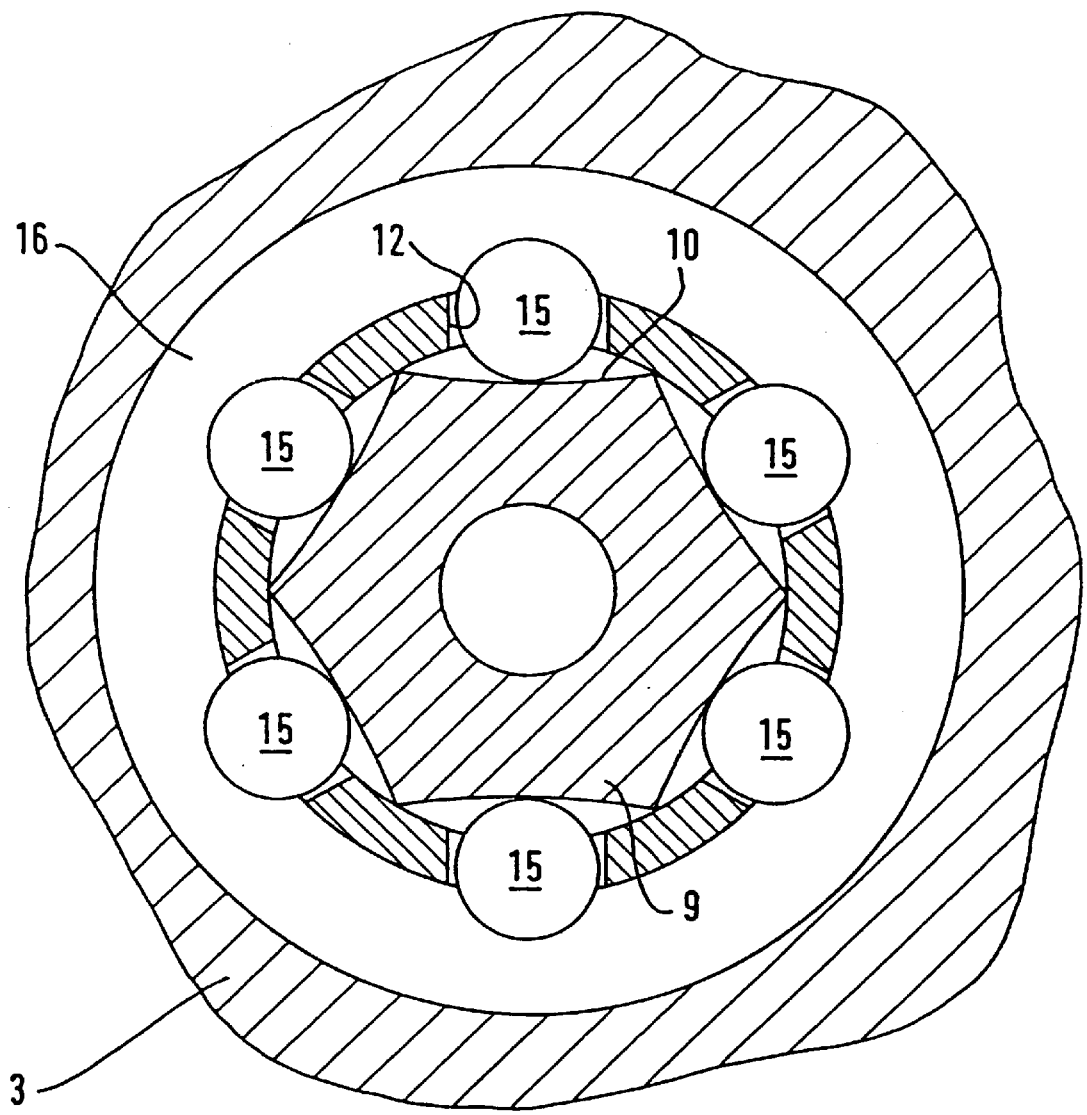
Figure 3:
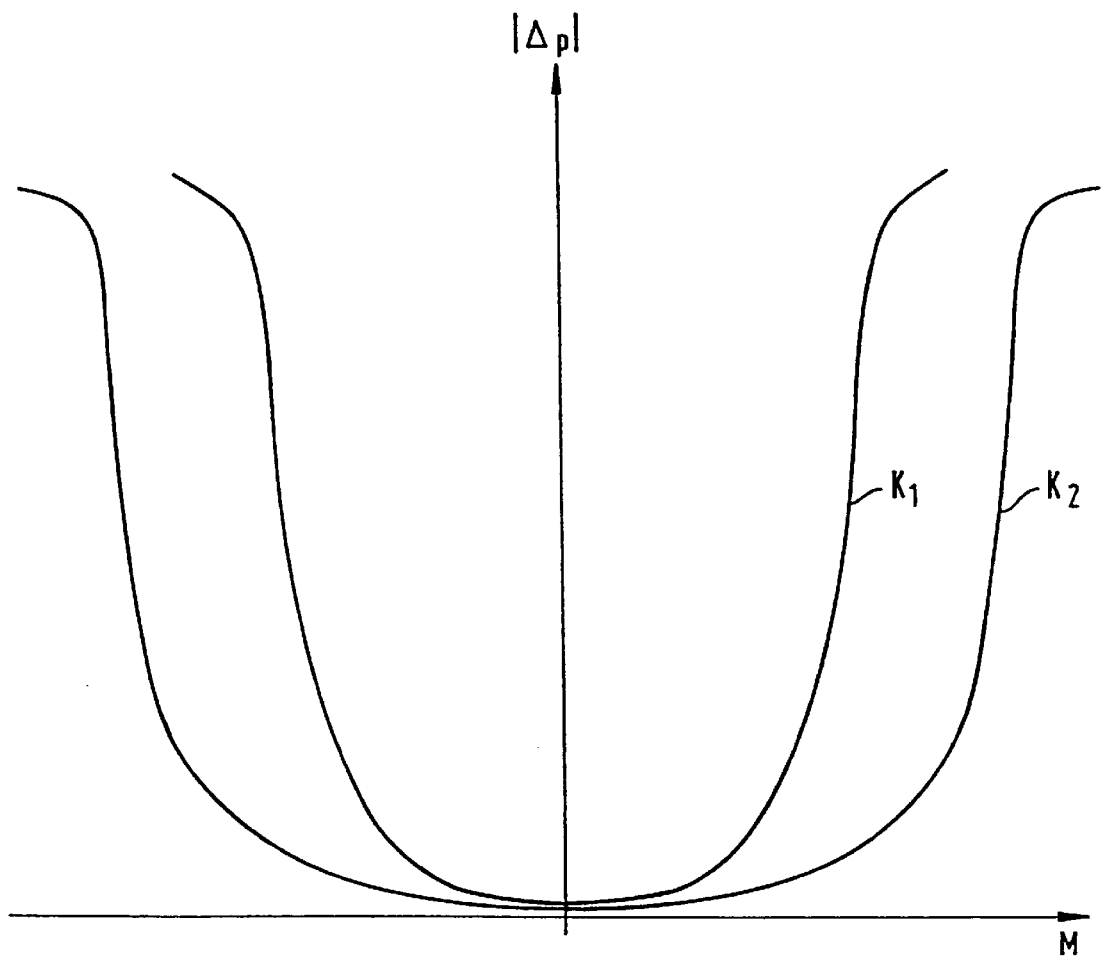
Figure 4A:
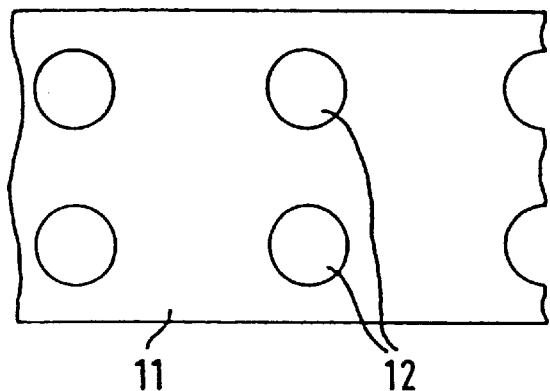
Figure 4B:
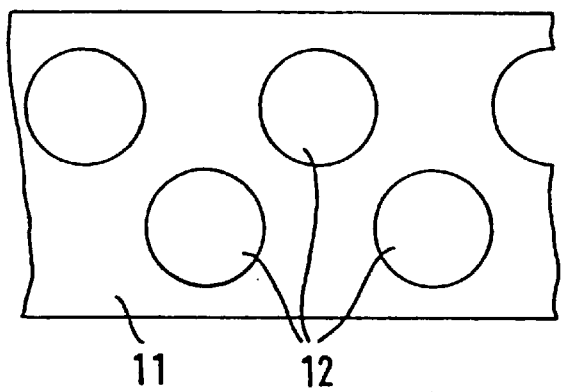
Figure 4C:
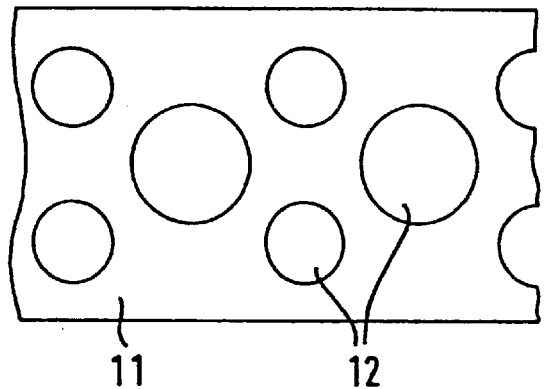

In the drawing:

FIG. 1 shows a diagrammatic axial section through the servovalve and the reaction arrangement, FIG. 2 shows a sectional diagram along the sectional line II—II in FIG. 1, FIG. 3 shows a graph which illustrates the effective hydraulic pressure of the servomotor as a function of the manual torque to be applied to the steering wheel, and FIG. 4 shows various possibilities for the arrangement of reaction balls.

In FIG. 1, a rotary slide 1 is received by a control bush 2 which is coaxial to the latter and which is arranged rotatably within a housing 3. The rotary slide 1 and control bush 2 can be rotated relative to one another to a limited extent, with the result that cooperating axial control edges 4 arranged on the rotary slide 1 and on the control bush 2 are adjusted relative to one another. Consequently, between two motor connections 5, which are connected to the two sides of a servomotor 6 designed as a double-acting piston/cylinder assembly and are hydraulically connected between a connection for the delivery side of a hydraulic pump 7 and a connection for a hydraulic reservoir 8 connected to the suction side of the pump 7, a controllable pressure difference is built up in one direction or the other, so that the servomotor 6 generates a corresponding boosting force in one direction or the other.

In the case of a power steering system of a motor vehicle, the rotary slide 1 (or the control bush 2) is mechanically connected to a steering wheel, not illustrated, and the control bush 2 (or the rotary slide 1) is mechanically connected to the vehicle directing wheels. The rotary slide 1 and control bush 2 are coupled to one another in a way illustrated in more detail below, in such a way that they can execute limited relative rotation relative to one another, the amount of which depends on the torque transmitted between the steering wheel and the vehicle directing wheels. As a result, the servomotor 6 thus generates a boosting force which is dependent on the torque transmitted between the steering wheel and the vehicle directing wheels and by means of which the manual force to be applied to the steering wheel is reduced.

This is basically known.

The rotary slide 1 possesses a shaft portion 9 which is spaced axially from the control edges 4 of the said rotary slide 1 and may have an increased diameter, as compared with the latter, and which is provided, on its circumference, with uniformly distributed axial V-grooves 10 which each attain, in their axially middle portion, a maximum depth decreasing continuously towards the axial ends of the V-grooves 10.

The control bush 2 has adjoining it a bush part 11 which surrounds the shaft portion 9 and which has a number of radial bores 12 corresponding to the number of V-grooves. The bush part 11 is connected fixedly in terms of rotation to the control bush 2, in such a way that the mid-axes of the radial bores 12 are in each case contained in an axial plane, containing the longitudinal mid-line of a V-groove 10, of the rotary slide 1, when rotary slide 1 and control bush 2 assume their middle position relative to one another, in which the motor connections 5 have identical hydraulic pressures.

DETAILED DESCRIPTION OF THE DRAWINGS

The bush part 11 and control bush 2 can be connected to one another in a corresponding relative position, in that the bush part 11 is pressed, with an inner cone 13 arranged on it, on an outer cone 14 present on the control bush 2. It becomes possible, by means of this connection, to adjust the bush part 11 exactly relative to the control bush 2.

Received displaceably in the radial bores 12 are balls 15 which, in a way illustrated below, can be pressed with greater or lesser force into the V-grooves 10 by being subjected to hydraulic pressure.

Produced within the housing 3 is a wide inner circumferential groove forming an annular space 16 which surrounds the region of the balls 15 and of the associated radial bores 12 of the bush part 11 and which extends axially as far as a radial orifice 17 in the housing 3. The diameter of the annular space 16 is dimensioned in such a way that, although the balls 15 can emerge to a greater or lesser extent from the radial bores 12 radially outwards, they cannot leave the associated radial bores 12 in this case.

When the rotary slide 1 and control bush 2 are being mounted in the housing 3, the rotary slide 1 and control bush 2, together with the shaft portion 9 and the bush part 11, can first be brought, within the housing 3, into an axial position, in which the radial bores 12 and the radial orifice 17 lie in a common radial plane. The corresponding rotational setting of the rotary slide 1 and control bush 2 then makes it possible to ensure that, in each case, a radial bore 12 and a V-groove 10 lie in a common axial plane of the rotary slide 1 with the radial orifice 17 and a ball 15 can be introduced into the respective radial bore 12 and the associated V-groove 10. The rotary slide 1 and control bush 2 are subsequently jointly rotated further, in such a way that, once again, a radial bore 12 and a V-groove 10 are aligned with the radial orifice 17, and so on and so forth. As soon as all the radial bores 12 and the associated V-grooves 10 have been equipped with balls 15, the rotary slide 1 and control bush 2 are displaced axially into the normal position illustrated in FIG. 1. The balls 15 are consequently retained captively in the associated radial bores 12.

The annular space 16 can be subjected, for example via the radial orifice 17, to a hydraulic pressure controllable as a function of parameters. The V-grooves 10 communicate, in a way illustrated merely diagrammatically, with the relatively pressureless hydraulic reservoir 9, so that the balls 15 can be urged into the V-grooves 10 by means of the abovementioned hydraulic pressure.

When the rotary slide 1 and control bush 2 of the servo-valve arrangement are rotated relative to one another, then, the bush part 11 also rotates relative to the V-grooves 10, with the result that the balls 15 come to bear either only on the right-hand or the left-hand flanks of the V-grooves 10 and, according to the pressure forces urge the balls 15 radially inwards, generate a torque which counteracts a rotational adjustment of the rotary slide 1 and control bush 2 out of their relative middle position.

FIG. 3, then, shows, for different hydraulic pressures in the annular space 16, the amount of the pressure difference $\Delta p$, effective in each case between the motor connections 5, as a function of a torque M transmitted between the rotary slide 1 and control bush 2. Here, the curve $K_1$ shows diagrammatically the ratios in the case of a disappearing hydraulic pressure in the annular space 16, the assumption being that the rotary slide 1 and control bush 2 are connected to one another in a rotationally elastic manner via a spring. When an increasing torque in one direction or the other is effective between the rotary slide 1 and control bush 2, the rotary slide and control bush 2 are increasingly rotated relative to one another, with the result that a progressively increasing pressure difference occurs between the motor connections 5.

The curve $K_2$, then, shows the ratios in the case of a higher hydraulic pressure in the annular space 16. Since this pressure presses the balls 15 into the V-grooves 10, corresponding resistance to relative rotation between the rotary slide and control bush 2 is generated by the balls 15 in cooperation with the flanks of the V-grooves 10. As a result, an increased torque must then be effective between the control slide 1 and control bush 2, in order to bring about appreciable relative rotation between control slide 1 and control bush 2. Higher pressure differences between the motor connections 5 will therefore then occur only when correspondingly higher torques are effective between the control slide 1 and control bush 2.

In order to keep frictional losses and, correspondingly, hysteresis effects low, it is desirable if the balls 15 roll on the flanks of the V-grooves 10 during relative rotation between the control slide 1 and control bush 2. For this purpose, it is advantageous if the flanks have only limited steepness in the circumferential direction of the shaft portion 9. Moreover, the diameters of the radial bores 12 should be slightly larger than the diameter of the balls 15, so that the balls 15 "float" in the radial bores 12, that is to say are kept away from the walls of the radial bores 12 by hydraulic medium. However, the diameter difference is to be only slight, so that a cross section of the annular gap formed between the inner circumference of the radial bores 12 and the balls 15 generates very high throttle resistance for the hydraulic medium.

FIG. 4, then, shows a developed view of the bush part 11, a plurality of circumferential rows offset axially relative to one another being provided for the radial bores 12 according to one possible advantageous embodiment.

In the example of diagram A, two radial bores 12 located axially next to one another are in each case arranged in a common axial plane of the bush part 11, so that the associated balls 15 can cooperate with a single V-groove 10 which must then have a corresponding axial length.

In the example of diagram B, the radial bores 12 of two adjacent rows are arranged so as to be offset relative to one another in the circumferential direction. This affords the possibility of keeping the axial distance between the two rows particularly short. Grooves arranged in a correspondingly offset manner must then be provided in the shaft portion 9.

Diagram C shows the possibility of also providing balls 15 and therefore radial bores 12 with different diameters.

By means of the embodiments illustrated by way of example in FIG. 4, the number of balls 15, and therefore the possible reaction force, can be increased, with the hydraulic pressure in the annular space 16 remaining the same, without undesirably steep flanks having to be provided on the V-grooves 10.

In the example of FIG. 2, the grooves 10 are of very shallow design. Instead, it is also possible, and advantageous, to provide V-grooves having a markedly smaller opening angle. In this case, the steepness of the flanks of the groove may, if appropriate, decrease in the transverse direction of the groove, that is to say the flanks are designed convexly on the ball side. It is also possible, however, for the steepness of the flanks to increase with an increasing transverse distance from the middle of the groove, that is to say the flanks of the groove are designed concavely on the ball side. In this way, the profile of the torque, which is brought about by the pressing of the balls against the flanks of the respective groove and depends on the angle of rotation between the shaft 9 and sleeve 10, can be adapted to the respective instance of use.

It is thereby possible, if appropriate, to dispense with a limiting valve which is conventional in hydraulic power steering systems.

According to FIG. 1, the rotary slide 1 and shaft part 9 may form a one-piece component. Instead, it is also possible to provide a two-part design, in which case the rotary slide 1 and shaft part 9 can be connected to one another, for example by flanging or welding or by means of screws, and the relative position of the control grooves 4 of the rotary slide 1 and of the grooves 10 of the shaft part 9 can be set when the parts 1 and 9 are being assembled.

The one-piece design demands higher manufacturing accuracy, but, by dispensing with connecting zones, makes it possible to have a particularly compact design.

A welded connection of the parts 1 and 9 also makes it possible to have a design which is comparatively short axially.

What is claimed is:

1. Reaction arrangement on a hydraulic servo-valve arrangement for a motor vehicle power steering system, comprising:
   a rotary slide;
   a control bush coaxially surrounding the rotary slide and rotatable relative to the rotary slide;
   a shaft part which is fixed in terms of rotation relative to the rotary slide and which defines axial grooves with flanks spread outwards in a V-shaped manner;
   a bush part which is fixed in terms of rotation relative to the control bush and which defines radial bores for the radial guidance of reaction bodies which can be pressed into the grooves with controllable hydraulic pressure; and
   a housing surrounding the bush part and defining at least one radial orifice, through which the reaction bodies can be inserted into the radial bores of the bush part when the bush part is appropriately positioned with respect to the housing in a reaction body mounting position which is different than an in use operating position of the bush part and housing.

2. Reaction arrangement according to claim 1, wherein the housing and the bush part are axially displaceable relative to one another between a mounting position, in which the radial orifice and the radial bores lie in a common radial plane with respect to the bush axis, and an operating position, in which the radial orifice is axially offset relative to the radial bores.

3. Reaction arrangement according to claim 1, wherein an annular space is defined between the bush part and the housing, the reaction bodies being movable out of the radial bores into said annular space.

4. Reaction arrangement according to claim 3, wherein the annular space is continued axially as far as the radial orifice or has a corresponding axial continuation.

5. Reaction arrangement according to claim 3, wherein the annular space can be subjected to the controllable hydraulic pressure.

6. Reaction arrangement according to claim 1, wherein the grooves communicate with a low-pressure connection or reservoir.

7. Reaction arrangement according to claim 1, wherein the reaction bodies are balls.

8. Reaction arrangement according to claim 1, wherein the diameter of the radial bores is slightly larger than the diameter of the reaction bodies, such that an annular gap is defined between the respective reaction body and the radial bore to cause a high throttle effect.

9. Reaction arrangement according to claim 1, wherein the radial bores are arranged in a plurality of radial planes.

10. Reaction arrangement according to claim 2, wherein an annular space is defined between the bush part and the housing, the reaction bodies being movable out of the radial bores into said annular space.

11. Reaction arrangement according to claim 10, wherein the annular space is continued axially as far as the radial orifice or has a corresponding axial continuation.

12. Reaction arrangement according to claim 11, wherein the annular space can be subjected to the controllable hydraulic pressure.

13. Reaction arrangement according to claim 2, wherein the grooves communicate with a low-pressure connection or reservoir.

14. Reaction arrangement according to claim 10, wherein the grooves communicate with a low-pressure connection or reservoir.

15. Reaction arrangement according to claim 2, wherein the reaction bodies are designed as balls.

16. Reaction arrangement according to claim 10, wherein the reaction bodies are designed as balls.

17. Reaction arrangement according to claim 12, wherein the reaction bodies are designed as balls.

18. Reaction arrangement according to claim 2, wherein the diameter of the radial bores is slightly larger than the diameter of the reaction bodies, in such a way that a gap annularly surrounding the respective reaction body and having a high throttle effect is formed.

19. Reaction arrangement according to claim 10, wherein the diameter of the radial bores is slightly larger than the diameter of the reaction bodies, in such a way that a gap annularly surrounding the respective reaction body and having a high throttle effect is formed.

20. Reaction arrangement according to claim 14, wherein the diameter of the radial bores is slightly larger than the diameter of the reaction bodies, in such a way that a gap annularly surrounding the respective reaction body and having a high throttle effect is formed.

21. Reaction arrangement according to claim 16, wherein the diameter of the radial bores is slightly larger than the diameter of the reaction bodies, in such a way that a gap annularly surrounding the respective reaction body and having a high throttle effect is formed.

22. Reaction arrangement according to claim 2, wherein the radial bores are arranged in a plurality of radial planes.

23. Reaction arrangement according to claim 3, wherein the radial bores are arranged in a plurality of radial planes.

24. Reaction arrangement according to claim 4, wherein the radial bores are arranged in a plurality of radial planes.

25. Reaction arrangement according to claim 5, wherein the radial bores are arranged in a plurality of radial planes.

26. Reaction arrangement according to claim 8, wherein the radial bores are arranged in a plurality of radial planes.

27. A method of assembling a reaction arrangement on a hydraulic servo-valve arrangement for a motor vehicle power steering system, comprising:
   a rotary slide;
   a control bush coaxially surrounding the rotary slide and rotatable relative to the rotary slide;
   a shaft part which is fixed in terms of rotation relative to the rotary slide and which defines axial grooves with flanks spread outwards in a V-shaped manner;
   a bush part which is fixed in terms of rotation relative to the control bush and which defines radial bores for the radial guidance of reaction bodies which can be pressed into the grooves with controllable hydraulic pressure; and
   a housing surrounding the bush part and defining at least one radial orifice, through which the reaction bodies can be inserted into the radial bores of the bush part when the bush part is appropriately positioned,
   said method comprising:
      aligning said shaft part and said bush part such that said grooves are aligned coaxially with said radial bores to define respective aligned groove-bore sets;
      aligning one of said groove-bore sets with said radial orifice;
      inserting one of said reaction bodies into said aligned groove-bore set;
      rotating said shaft part and said bush part until an another one of said groove-bore sets is aligned with said radial orifice; and
      repeating said inserting act and said rotating act until one of said reaction bodies is inserted into each of said groove-bore sets; and
      sliding said shaft part, said bush part, and said reaction bodies axially such that said reaction bodies are positioned at an axial distance from said radial orifice.

28. Reaction arrangement on a hydraulic servo-valve arrangement for a motor vehicle power steering system, comprising:
   a rotary slide;
   a control bush coaxially surrounding the rotary slide and rotatable relative to the rotary slide;
   a shaft part which is fixed in terms of rotation relative to the rotary slide and which defines axial grooves with flanks spread outwards in a V-shaped manner;
   a bush part which is fixed in terms of rotation relative to the control bush and which defines radial bores for the radial guidance of reaction bodies which can be pressed into the grooves with controllable hydraulic pressure; and
   a housing surrounding the bush part and defining at least one radial orifice, through which the reaction bodies can be inserted into the radial bores of the bush part when the bush part is appropriately positioned,
   wherein the housing and the bush part are axially displaceable relative to one another between a mounting position, in which the radial orifice and the radial bores lie in a common radial plane with respect to the bush axis, and an operating position, in which the radial orifice is axially offset relative to the radial bores.

29. Reaction arrangement on a hydraulic servo-valve arrangement for a motor vehicle power steering system, comprising:
   a rotary slide;
   a control bush coaxially surrounding the rotary slide and rotatable relative to the rotary slide;
   a shaft part which is fixed in terms of rotation relative to the rotary slide and which defines axial grooves with flanks spread outwards in a V-shaped manner;
   a bush part which is fixed in terms of rotation relative to the control bush and which defines radial bores for the radial guidance of reaction bodies which can be pressed into the grooves with controllable hydraulic pressure; and
   a housing surrounding the bush part and defining at least one radial orifice, through which the reaction bodies can be inserted into the radial bores of the bush part when the bush part is appropriately positioned,
   wherein an annular space is defined between the bush part and the housing, the reaction bodies being movable out of the radial bores into said annular space,
   wherein the annular space is continued axially as far as the radial orifice or has a corresponding axial continuation.

30. Reaction arrangement on a hydraulic servo-valve arrangement for a motor vehicle power steering system, comprising:
   a rotary slide;
   a control bush coaxially surrounding the rotary slide and rotatable relative to the rotary slide;
   a shaft part which is fixed in terms of rotation relative to the rotary slide and which defines axial grooves with flanks spread outwards in a V-shaped manner;
   a bush part which is fixed in terms of rotation relative to the control bush and which defines radial bores for the radial guidance of reaction bodies which can be pressed into the grooves with controllable hydraulic pressure; and
   a housing surrounding the bush part and defining at least one radial orifice, through which the reaction bodies can be inserted into the radial bores of the bush part when the bush part is appropriately positioned,
   wherein the radial bores are arranged in a plurality of radial planes.

\* \* \* \* \*